March 29, 1927.  
T. S. COLE  
1,622,767  
SECONDARY BATTERY  
Filed July 25, 1921
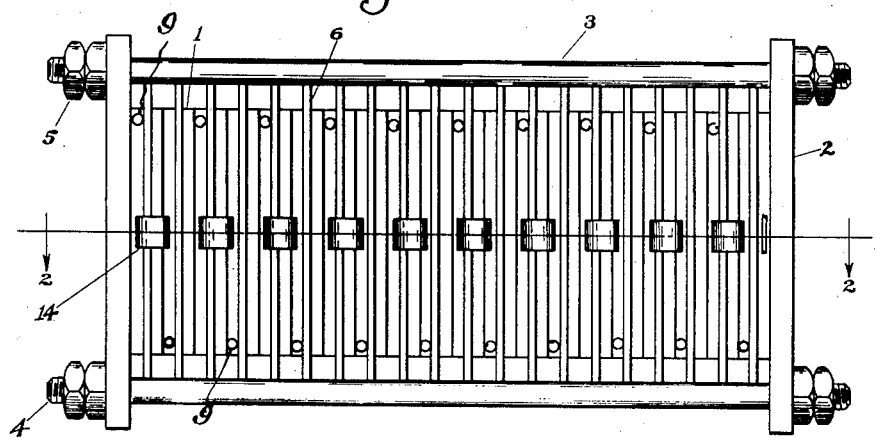
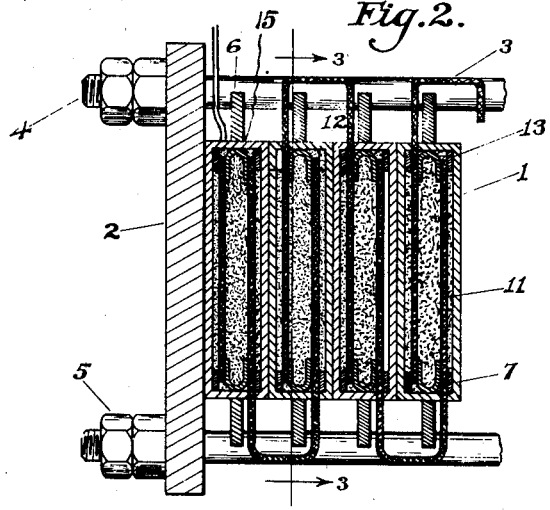
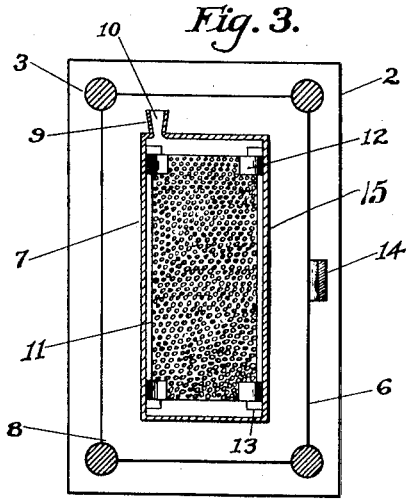
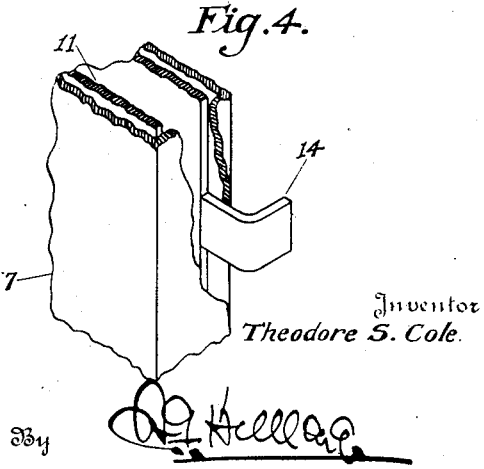
Inventor  
Theodore S. Cole.  
By  
Attorney Patented Mar. 29, 1927.

1,622,767

UNITED STATES PATENT OFFICE.

THEODORE S. COLE, OF NEW HAVEN, CONNECTICUT, ASSIGNOR TO ENGINEERS DEVELOPMENT COMPANY, A PARTNERSHIP COMPOSED OF FREDERICK E. PERNOT AND CARL KINGSLEY.

SECONDARY BATTERY.

Application filed July 25, 1921. Serial No. 487,456.

This invention relates to improvements in secondary or storage batteries and has for an object to provide a high voltage battery of compact, durable and light construction, in order that moving or transporting of the same will be facilitated.

An equally important object of the invention may be stated to reside in the provision of a high voltage secondary battery which will be free from all leakage of current as between the various cells thereof, thus permitting the battery to produce its maximum E. M. F. when functioning under normal conditions.

Other objects will be in part obvious and in part pointed out hereinafter.

In order that the invention and its mode of operation may be readily understood by persons skilled in the art, I have in the accompanying illustrative drawings and in the following detailed description, set forth a practical embodiment of the same.

In these drawings:

Figure 1 is a fragmentary side elevation of the improved battery;

Figure 2 is a horizontal longitudinal section therethrough;

Figure 3 is a vertical transverse section through the same;

Figure 4 is a detail in perspective of one of the electrodes or Planté plates showing the arrangement of its respective terminals.

Having more particular reference to the drawings in connection with which like characters of reference will designate corresponding parts throughout the several views, my improved battery comprises a plurality of juxtaposed cells generally indicated by the numeral 1, these cells being held in such relation through the medium of end plates 2 formed of hard polished rubber and provided with suitable terminals. As will be noted, these end plates 2 are of greater size than the cells 1 and by consequence, project beyond the same. Openings are formed in certain portions of these plates 2 and receive therethrough the opposite ends of hard rubber clamping rods 3, the opposite extremities of said rods being screw-threaded as at 4 and having nuts 5 bearing upon the adjacent portions of the opposite faces of said end plates 2. Due to the method of clamping the cells 1 in their operative relation, it will be appreciated that I am enabled to either increase or decrease the number thereof, as conditions or preference may dictate, such variance of cells being easily effected through the removal of one of the end plates 2 and the addition or subtraction of the desired number of cells whereupon the particular end plate referred to is replaced and reclamped by the clamping rods 3 arranged adjacent the four corners of the cells as shown in Figure 3.

Referring now to the individual construction of the cells 1, which as will be understood, are constructed alike, the same may be stated to comprise a thin hard rubber diaphragm 6 extending on all sides from the cell walls 7 and having concave seats 8 formed at its various corners adapted for the snug reception of the clamping rods 3. The cell walls 7 are also preferably formed of thin hard rubber and as shown in Figure 3, are snugly received in the substantially rectangularly shaped diaphragms 6 in order that movement as between these several elements will be prevented.

Filling openings 9 are provided the various cells and as will be noted, are staggered whereby to avoid any possible contact between the electrolytes during a filling operation of the battery, these filling openings, as illustrated in Figure 3, communicating with ducts 10 formed in corresponding portions of the cell walls 7.

Arranged in each of the cells 1 is a pair of thin perforated Planté plates 11, which, as will be noted, are maintained in spaced relation by means of substantially U-shaped insulating separators 12, while hard rubber tabs 13 are arranged adjacent the various corners of these several plates on their opposite sides and afford abutments for maintaining the Planté plates 11 spaced from the outer walls of the cell 7. Connecting terminals 14 are arranged on the opposite sides of the Planté plates 11, being preferably formed integral therewith and as shown in the Figure 1 are interconnected in a suitable manner, as by burning the same together. By this opposite arrangement of the terminals 14, all danger of short circuiting of the same will be avoided and hence, proper functioning of the battery subsequent to assembly of its various cells, will be insured.

Because of the construction of my improved high voltage secondary battery, I preferably employ a gelatinized electrolyte, since, obviously, the same will permit of operation of the battery in any position without spilling; the electrolyte being arranged or placed between the oppositely disposed Planté plates 11 of the various cells 1 and through them making contact with rear of plate.

During assembly of the cells of a battery constructed in accordance with my invention, I may, and preferably do, dip the edges of the cell walls in a hot asphaltum solution in order that a perfect seal between the same together with their respective diaphragms 6 will be had. Furthermore, all exterior parts of the hard rubber elements of the construction are polished in order to prevent the forming of moisture thereon, it being understood in this connection, that moisture does not wet a hard polished rubber surface and by reason of this avoidance, cannot form a continuous electrical leakage path between any two points on the exterior at different potentials. Any moisture coming in contact with the exterior surface so mentioned, immediately collects in drops and hence causes no leakage path to be formed.

From the foregoing, it will be understood that a secondary battery constructed in accordance with my invention constitutes a high voltage accumulator free from all intercell leakage currents; furthermore, a light and compact arrangement which can be readily disassembled, repaired and re-assembled. However, it is to be expressly understood that the construction shown is capable of considerable modification, and such modification as is within the spirit of my claims, I consider within the scope of my invention.

I claim:

1. A secondary battery comprising a plurality of juxtaposed electrically connected self-contained unit cells, insulating diaphragms fixed on and extending outwardly in all directions from the wall of each of said cells, and clamping means for said cells separately engageable with the edges of the diaphragms for releasably securing the cells in their juxtaposed electrically connected relation, and for holding said diaphragms and the cells on which they are fixed against lateral displacement.

2. A secondary battery comprising a number of interchangeable self contained independent unit cells arranged in juxtaposed relation and electrically interconnected, insulating diaphragms arranged on and extending laterally from the sides of each of said cells, end cells arranged on the opposite ends of the battery having electrical terminals and clamping means separately engaging the corners of all the diaphragms and the end cells for securing the cells in their juxtaposed relation, and at the same time maintaining the diaphragms and thereby the cells in alignment.

3. A secondary battery comprising a plurality of juxtaposed self contained unitary independent and electrically interconnected cells, insulating diaphragms fixed on and extending outwardly from the sides of said cells, end cells having terminals led out for the battery, clamping plates engaging the end cells, and clamping means connecting the same and engaging the corners of said diaphragms to secure the various cells in their juxtaposed and angular relation.

4. A secondary battery comprising a number of interchangeable juxtaposed self contained electrically interconnected unit cells, each of which includes enclosing walls therefor, a web fixed on the walls of each cell and extending laterally from the marginal portions of the walls of the same, electrodes in the cell, terminals extending laterally from the opposite sides of said electrodes, the terminals being separated by said webs, clamping plates arranged on the opposite ends of the battery constituted by the said cells, and means for securing said clamping plates together for maintaining said cells in their juxtaposed relation, said means also engaging the corners of said webs for maintaining alignment of the same and of the cells.

5. A secondary battery comprising a plurality of independent juxtaposed cells the cell enclosures being composed of non-hygroscopic material highly polished on its exterior surface, and terminals for the cells projecting through the walls of said enclosure, whereby leakage by formation of surface films of moisture between the terminals of one cell or of juxtaposed cells is rendered impossible.

6. A secondary battery comprising a plurality of individual battery cells, diaphragms extending from the sides of same, and clamping means for holding the cells together as a unit by securing the corners of said diaphragms, said diaphragms and clamping means being of the same material whereby variations of temperature will not affect the clamping effect.

7. A secondary battery comprising a plurality of individual battery cells, insulating diaphragms fixed on and extending outward from the walls of same and clamping means on the edges of said diaphragms for holding the cells together as a unit, the material of said cells and said clamping means having substantially the same thermal coefficient of expansion.

T. S. COLE.